United States Patent [19]

Wang

[11] 3,903,044

[45] Sept. 2, 1975

[54] PHOSPHORUS-CONTAINING POLYARYLENES

[75] Inventor: Chen-Shen Wang, Naperville, Ill.

[73] Assignee: The Standard Oil Company, Chicago, Ill.

[22] Filed: Jan. 14, 1974

[21] Appl. No.: 433,256

Related U.S. Application Data

[63] Continuation-in-part of Ser. No. 314,917, Dec. 14, 1972, abandoned, which is a continuation-in-part of Ser. No. 169,430, Aug. 5, 1971, abandoned.

[52] U.S. Cl................ 260/47 P; 260/2 P; 260/874; 260/897 R

[51] Int. Cl....................... C08g 33/16; C08s 25/00

[58] Field of Search.......................... 260/2 P, 47 P

*Primary Examiner*—Melvin Goldstein
*Attorney, Agent, or Firm*—Wallace L. Oliver; Arthur G. Gilkes; William T. McClain

[57] ABSTRACT

A phosphorus-containing polyarylene is disclosed which is prepared by reacting a polyarylene with a member of a particular class of phosphorus-containing compounds. The product polyarylene is useful as a flame-retardant material in thermoplastics and cellular polymers.

13 Claims, No Drawings

PHOSPHORUS-CONTAINING POLYARYLENES

CROSS-REFERENCES

This application is a continuation-in-part of Ser. No. 314,917 filed Dec. 14, 1972 which was a continuation-in-part of Ser. No. 169,430, filed Aug. 5, 1971, both now abandoned.

BACKGROUND OF THE INVENTION

Polyarylenes are polymers which have aromatic rings as their polymer backbone. These polymers are known for their high thermal stability. They are generally produced by techniques such as the acid catalyzed oxidative coupling of benzene ring compounds. Polymers produced in this manner are generally insoluble and difficult to fabricate. Recently improved polyarylenes have been developed which are much more useful due to their solubility in aromatic solvents.

Phosphorus compounds have been used for many years in the thermoplastic and cellular plastic fields as fire retardants, plasticizers, and heat and/or light stabilizers. Phosphorus compounds have also been used as antioxidant and corrosion inhibitors for lubricating oils.

The phosphorus-containing polyarylene described below combines the high-temperature stability of the polyarylene with the flame retardant and stabilizer properties of phosphorus compounds.

SUMMARY OF THE INVENTION

This invention relates to a phosphorus-containing polyarylene composition which is prepared by reacting at a temperature between 250°F and 600°F (1) a polyarylene having an inherent viscosity of at least 0.01 with (2) a phosphorus-containing compound selected from the group consisting of

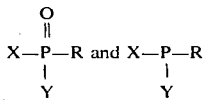

wherein R is phenyl or phenoxy; X is F, Cl, Br, or I; and Y is F, Cl, Br, I, phenyl, or phenoxy. Preferably, this invention relates to a phosphorus-containing polyarylene prepared by reacting the above-described phosphorus compound with a polyarylene produced by the dehydrogenative coupling of partially hydrogenated aromatic hydrocarbons.

The phosphorus-containing polyarylenes of this invention are particularly useful as flame retardants for plastics and cellular polymers and as a heat and light stabilizer for thermoplastics.

DESCRIPTION OF THE INVENTION

The phosphorus-containing compounds which are suitable for use in the preparation of the phosphorus-containing polyarylenes of this invention are

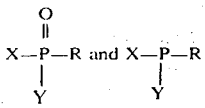

wherein R is phenyl or phenoxy; X is F, Cl, Br, or I; and Y is phenyl, phenoxy, F, Cl, Br, or I. Preferably, the phosphorus-containing compound is one of the following reagents:

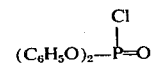

(diphenyl chlorophosphate),

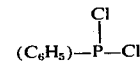

(phenyl phosphorus dichloride),

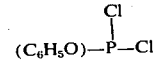

(phenyl dichlorophosphate),

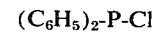

(diphenyl phosphorus chloride).

The polyarylenes suitable for use in the preparation of the product of this invention include any polyarylene which has an inherent viscosity of at least 0.01 when measured in trichlorobenzene at 135°C at a concentration of 0.02 g/ml. The term polyarylene, as defined herein, includes polymers which are made up of alkyl-substituted or alkyl-unsubstituted aromatic ring structures or mixtures thereof. That is, they are polymers which have aromatic hydrocarbons as the polymer backbone. These aromatic ring structures can be benzene-type ring structures such as from benzene or toluene. They can also be polynuclear-type ring structures such as from naphthalene. These polyarylenes can be distinguished from other aromatic polymers in that the aromatic ring structures of the polyarylenes used herein are not separated by functional groups. More useful phosphorus-containing polyarylenes are obtained when the polyarylene has an inherent viscosity of at least 0.02 when measured in trichlorobenzene at a concentration of 0.02 g/ml.

Preferably, the polyarylene is prepared by the dehydrogenative coupling of partially hydrogenated aromatics. Polyarylenes prepared in this manner are preferred because they are soluble in many aromatic solvents, are thermally stable, and are fusible. A process for the production of these preferred polyarylenes is described in co-pending application Ser. No. 264,846 which is a continuation-in-part of Ser. No. 858,867, now abandoned. An improved version of this process is described in Ser. No. 274,587 which is a continuation-in-part of Ser. No. 169,429, now abandoned. These applications are herein incorporated by reference.

The preferred polyarylenes are readily prepared by a one-step process starting with partially hydrogenated aromatic hydrocarbons, by a two-step process starting with aromatic hydrocarbons or a mixture of aromatic hydrocarbons and partially hydrogenated aromatic hydrocarbons. They can also be prepared by a combination of these process steps.

The one-step process consists of the catalytic dehydrogenative coupling of the partially hydrogenated aromatic hydrocarbons in the presence of hydrogen at elevated temperatures and pressures. The two-step process consists of a controlled partial hydrogenation as well as the dehydrogenative coupling. The two-step process begins with either aromatic hydrocarbons or a mixture of aromatic hydrocarbons and partially hydrogenated aromatic hydrocarbons. Preferably, a mixture of aromatic hydrocarbons with from about 1% to 10% of partially hydrogenated aromatic hydrocarbons is employed. This two-step process of controlled hydrogenation and dehydrogenative coupling can be run as two separate steps or can be combined into one reaction during which the controlled hydrogenation and the dehydrogenative coupling can be occurring simultaneously.

Suitable starting materials or monomers for use in the practice of this invention are any of the aromatic hydrocarbons containing an aromaatic ring structure or any of the partially hydrogenated aromatic hydrocarbons containing a partially hydrogenated aromatic ring structure. The partially hydrogenated aromatic compounds must be hydrogenated to at least their dihydro derivatives but must not be fully hydrogenated. The monomers must have at least two unsubstituted positions for the subsequent coupling reactions. Unsubstituted means that these positions contain no substituents other than hydrogen atoms. However, the above aromatic hydrocarbons and partially hydrogenated aromatic hydrocarbons may contain substituents such as from 1 to 3 alkyl groups containing from 1 to 3 carbon atoms.

Specific examples of aromatic hydrocarbons which can be polymerized are benzene, biphenyl, toluene, xylene, ethylbenzene, and the like. Examples of partially hydrogenated aromatic hydrocarbons are the hydrophenyls such as cyclohexadiene and cyclohexene, the partially hydrogenated biphenyls such as phenyl cyclohexadiene, phenyl cyclohexene, and phenyl cyclohexane, the partially hydrogenated toluenes, the partially hydrogenated xylenes, and the like.

While either the aromatic hydrocarbons or the partially hydrogenated aromatic hydrocarbons may be reacted alone, a mixture of aromatics and partially hydrogenated aromatics may be employed. In a preferred process when an aromatic hydrocarbon is employed as a starting material, it may be mixed with from about 1% to 10%, more preferably 1% to 5%, of a partially hydrogenated aromatic hydrocarbon.

The catalyst systems useful to prepare the polyarylenes are such as silica, alumina, or preferably, mixtures of silica and alumina. Also useful are the noble metal catalysts supported on the above, alkalized chromium trioxide, alkalized ferric oxide, nickel and molybdenum oxides, sodium, calcium, cobalt, or molybdenum oxides or mixtures thereof, and the like, all supported on alumina, silica, or alumina-silica mixtures.

Another useful catalyst system is a high surface active carbon. The surface area of the highly active carbon catalyst is preferably at least about 1500 $m^2/g$ and most preferably about 2000 to about 3000 $m^2/g$. The active carbon catalyst which is used is preferably base treated. Typical bases which may be used to treat the carbon catalysts are KOH, NaOH, $Ca(OH)_2$, $Mg(OH)_2$ and the like. However, the most preferred bases are NaOH and KOH.

Whatever catalyst is used, the amount necessary will vary with the materials being polymerized and the reaction conditions. For most reaction systems at least about 1% by weight catalyst, based on the monomer weight, is used with about 2% to about 4% by weight being preferred.

Optimum time, pressure, and temperature conditions for the production of the polyarylene depend upon the nature of the particular compounds being polymerized as well as the particular catalyst system being employed. Certain advantageous reaction conditions are described below.

In a one-step process starting with the partially hydrogenated aromatic hydrocarbons, temperatures within the range of 750°F to about 1300°F, preferably about 900°F to 1200°F, and pressures within the range of 600 psig to 2000 psig, preferably 1000 psig to 1700 psig, more preferably 1200 psig to 1600 psig, have been found useful.

In a two-step process starting with the aromatic hydrocarbons or a mixture of aromatic hydrocarbons and partially hydrogenated aromatic hydrocarbons, we have found that temperatures within the range of 400°F to 1200°F, preferably 750°F to 1100°F, and pressures within the range of 500 psig to 2000 psig, preferably 800 psig to 1500 psig, are useful in the hydrogenation step. In the dehydrogenation step, we have found temperatures within the range of 800°F to 1300°F, preferably 900°F to 1200°F, and pressures within the range of 600 psig to 2000 psig, preferably 1000 psig to 1700 psig, to be particularly useful.

Both the controlled hydrogenation and the dehydrogenative coupling steps need to be conducted in the presence of hydrogen. The hydrogen partial pressure should be at least about 10% of the total pressure at reaction conditions. Preferably the hydrogen partial pressure is from about 30% to 60% of the total reaction pressure at reaction conditions. More preferably, the partial hydrogen pressure is about half of the total pressure.

In a preferred method of polyarylene preparation, the steps of controlled hydrogenation and dehydrogenative coupling can be combined into one process. In this process, aromatic hydrocarbons or a mixture of aromatics with partially hydrogenated aromatics are charged to a sealed, stirred reactor along with a suitable catalyst and sufficient hydrogen gas. The reactor is then heated to an elevated temperature, generally under constant heat input conditions. In the early stages of the reaction, after the initial heat up period, the temperature tends to increase at a very gradual rate. After a period of time, generally a number of hours, the temperature begins to increase at a more rapid rate. After a further time, the temperature generally reaches a peak and begins to decrease somewhat. After another interval of time, the temperature tends to level off at a value which is measurably lower than the peak temperature. Thus, the reaction temperature increases rapidly during initial heat up, basically levels off for a time, and then goes through a noticeable temperature increase followed by a noticeable decrease in temperature. Finally the temperature levels off again.

While not wishing to be bound by any theory, the following is offered as an explanation of this observed behavior. The partial hydrogenation of the starting material in the process is exothermic. The dehydrogenative coupling of the partially hydrogenated aromatics is endothermic. After the initial heat up period, during the period of gradual temperature increase, it is believed that some hydrogenation is occurring along with possibly a small amount of dehydrogenative coupling. During the period at which the temperature is found to be increasing more rapidly, the system is believed to have begun to react in substantial proportion in terms of the partial hydrogenation. It is also believed that some dehydrogenative coupling is occurring during this time. After the temperature has reached its peak point, the rate of dehydrogenative coupling is believed to be significantly greater than the rate of partial hydrogenation. When the temperature levels off again after having reached a peak temperature, the dehydrogenative coupling is considered to be complete for all practical purposes.

It should be kept in mind that the above-described temperature behavior does not always occur. With some monomers and catalyst systems, the decreasing temperature stage is not observed. However, soluble polyphenylenes are still being produced.

In this preferred process, the temperature reached after initial heat up is generally within the range of 400°F to about 1100°F, preferably about 800°F to 1000°F. The peak reaction temperature is generally within the range of 900°F to about 1300°F, preferably 1000°F to 1200°F. The pressures reached after the initial heat up are generally within the range of 600 psig to 1200 psig, although higher pressures are possible. The maximum pressure attained is generally within the range of 1000 psig to 2000 psig, preferably 1200 psig to 1700 psig. The partial hydrogen pressure is as described above.

A particularly preferred polyarylene is a polyarylene produced by dehydrogenative coupling which has an inherent viscosity between about 0.02 and 0.06.

The phosphorus-containing polyarylene of this invention is prepared by reacting the polyarylene with the above described phosphorus-containing compound at a temperature between 250°F and 600°F, preferably 400°F to 600°F. The reaction time will of course vary with the reaction temperature, but normally will be from about 3 to 24 hours and preferably from about 6 to 20 hours.

The reaction is generally conducted by contacting the polyarylene with a molar excess of the phosphorus compound. Preferably the molar ratio is about 1 mol of polyarylene to about 2–20 mols of the phosphorus compound. More preferably, about 1 mol of polyarylene is used to about 2–10 mols of the phosphorus compound.

The phosphorus-containing polyarylene of this invention can be prepared at atmospheric pressure. Elevated pressures can also be used. Reaction pressures between about 20 psig and 100 psig can normally be generated by the vapor pressure of the reactants.

While a catalyst is not necessary for the successful reaction between the polyarylene and phosphorus compound, reaction times can be reduced if they are used. Catalyst systems which may be used are Friedel-Crafts catalysts including among others CuCl, $BF_3$, $AlCl_3$ and $FeCl_3$. Normally about 0.5 to about 3.0 wt. % and preferably about 1 to about 1.5 wt. % catalyst, based on the total reactant weight is used.

After the reaction is completed, the reaction product is generally dissolved in a halogenated aromatic such as trichlorobenzene. Insolubles, including any catalyst, can be filtered out. An aliphatic hydrocarbon such as pentane is then usually added to precipitate out the phosphorus-containing polyarylene product. The product polyarylene is then washed with the same aliphatic hydrocarbon. The washed polymer product is then dried, preferably under a vacuum at about 120°C for about 24 hours.

The phosphorus-containing polyarylenes of this invention generally have inherent viscosities from about 0.03 to about 0.3 when measured in trichlorobenzene at 135°C at a concentration of 0.02 g/ml. Preferably, the inherent viscosity range is from about 0.05 to 0.2. On a weight basis, the product generally contains at least about 1% phosphorus. Preferably, it contains about 2% to 9% phosphorus.

Softening points in excess of 350°C have been obtained for the polymers of this invention. Weight losses of only 30% at 960°C, in nitrogen, have been obtained by thermal gravimetric analysis.

The phosphorus-containing polyarylenes of this invention are believed to contain two or more polyarylene groups connected through phosphorus linkages. In addition, the polymers of this invention may contain phosphorus substitutions on the aromatic ring structures of the polyarylene groups.

The phosphorus-containing polyarylenes of this invention may be used as fire-retardant additives for cellular plastics such as rigid urethane foams. These polymers may also be used in thermoplastics such as polystyrenes, polypropylene, and polyethylene as fire-retardant additives or as heat and light stabilizers. They may also be used in lubricating oils to provide antioxidant and corrosion protection.

The following examples are given in order to more clearly illustrate the compositions of this invention.

EXAMPLE 1

Into a stirred 3 neck flask, there was charged 10 g of a pentanesoluble polyphenylene, 11.7 g. of diphenyl chlorophosphate, and 0.32 g. of CuCl. The pentanesoluble polyarylene had an inherent viscosity of 0.02 when measured in trichlorobenzene at 135°C at a concentration of 0.02 g/ml using a Cannon-Ubbelohde viscometer. This corresponds to a number average molecular weight of about 400–500. These materials were thoroughly mixed in the nitrogen purged flask and were quickly brought up to 149°C. The reaction was continued for 6 hours at which time the reactants were cooled and were dissolved in 160 ml of 1,2,4-trichlorobenzene. The solution was filtered and flash evaporated to remove the catalyst, the unreacted diphenyl chlorophosphate, and the trichlorobenzene. The phosphorus-containing polyphenylene was then precipitated with n-pentane and was washed with water. The product was then dried in a vacuum oven overnight at 140°C. The solid product amounted to 5.6 g.

The phosphorus-containing polyphenylene had a number average molecular weight of 760 when measured by vapor pressure osmometry. It had the following elemental analysis: P = 1.30%, Cl = 1.31%, O = 2.12%, H = 5.13%, and C = 86.42%. The softening point for the product polymer was 140°C vs. 110°C for the polyarylene starting material.

EXAMPLE 2

Into a stirred 300 ml autoclave, there was charged 4.0 g of a catalyst, $Na_2O.CoO.MoO_3.SiO_2Al_2O_3$, 97.5 g of biphenyl, 2.5 g of phenylcyclohexane, and 300 psig of hydrogen. Constant heat input conditions were applied to bring the reactor contents up to an initial temperature of about 800°F. During a 7-hour reaction period under a constant level of heat input, the maximum temperature attained was 1070°F. The final reaction temperature prior to termination of the reaction was 950°F, and the maximum pressure was 1610 psig.

The reaction product was transferred to a 1000 ml beaker and dissolved in 500 ml of 1,2,4-trichlorobenzene with heat and stirring. After filtration of the catalyst, the filtrate was transferred to a 4000 ml flask and the trichlorobenzene polyarylene was precipitated with n-pentane. The polyarylene was then filtered and washed with n-pentane and was dried in a vacuum oven at 100°C for 24 hours. The product polyarylene which was soluble in trichlorobenzene and insoluble in n-pentane had an inherent viscosity of 0.05 when measured in trichlorobenzene at 135°C using a Cannon-Ubbelohde viscometer. This corresponds to a number average molecular weight of about 2000.

Twenty grams (20 g) of the above-prepared polyarylene was placed in a 3 neck flask along with 11.7 g of diphenyl chlorophosphate and 0.32 g of CuCl. The reactants were kept under a nitrogen blanket and were stirred. The reactants were quickly brought up to 300°F. After 6 hours at 300°F, 80 ml of trichlorobenzene was added and the combined solution was heated for 5 additional hours. This product was then filtered and another 80 ml of trichlorobenzene was added. The product was then washed with n-pentane. The phosphorus-containing polyphenylene precipitate amounted to 22.70 g. This product was dried to 20.69 g of solid material.

The solid phosphorus-containing polyphenylene had an inherent viscosity of 0.29 when measured in trichlorobenzene at 135°C. This corresponds to a number average molecular weight of about 20,000. The elemental analysis was as follows:

$P = 0.41\%$, $Cl = 0.60\%$, $O = 1.39\%$, $C = 92.50\%$, and $H = 4.48\%$.

The softening point was greater than 350°C, whereas the softening point of the polyarylene starting material was 200°C. The thermal gravimetric weight loss at 960°C in nitrogen was 30% for the phosphorus-containing polyarylene vs. 67% weight loss for the polyarylene.

EXAMPLE 3

Into a stirred 300 ml autoclave there was charged 2.0 g of an active carbon catalyst, 97.5 g of biphenyl, 2.5 g of phenylcyclohexane, and 300 psig of hydrogen. Constant heat input conditions were applied for a 7-hour reaction period. The maximum temperature was 1075°F. The maximum pressure was 1370 psig. The final reaction temperature was 1040°F.

In a similar manner, a reactor was charged with the same ingredients except that the active carbon catalyst contained 14% by weight of KOH. In a 7-hour reaction period under constant heat input conditions, a temperature of 1090°F. was reached. The maximum pressure was 1450 psig. The final temperature was 988°F.

These two polyarylenes were worked up in a manner similar to that described in Example 1. Equal weights of these two polyarylenes were blended together and were found to have an inherent viscosity of 0.03.

Fifteen grams (15 g) of the combined polyarylene material was charged into a 3 neck flask along with 17.55 g of diphenyl chlorophosphate and 0.48 g of CuCl. These materials were reacted for 6 hours at 300°F and were worked up with the same procedure described in Example 2. The solid phosphorus-containing polyarylene amount to 12.56 g. It had an elemental analysis as follows:

$P = 0.33\%$, $Cl = 0.63\%$, $O = 1.72\%$, $H = 5.05\%$, and $C = 92.11\%$.

EXAMPLE 4

A pressure bottle was charged with 5.0 g of the polyarylene described in Example 3, 11.7 g of diphenyl chlorophosphate, and 1.5 g of CuCl. These reactants were heated for 3 hours at 480°F. The maximum pressure at reaction temperature was 79.5 psig. The residual pressure at 25°C was 16 psig. The product from this reaction was filtered, dissolved in trichlorobenzene, and was precipitated in pentane. After further filtration and drying, 4.61 g of solid was obtained. This product had an inherent viscosity of about 0.05. The phosphorus content was 2.3%.

EXAMPLE 5

A pressure bottle was charged with 5.0 g of a polyarylene having an inherent viscosity of 0.11, 11.7 g of diphenyl chlorophosphate, and a catalyst. The reactants were heated for a total of 16 hours, at temperatures between 430° and 450°F. The maximum pressure was 31 psig. After a workup similar to that described in Example 2, 6.48 g of product was obtained. 4.67 g were insoluble in trichlorobenzene and 1.81 g were soluble in trichlorobenzene. The trichlorobenzene insoluble product had a phosphorus content of 6.7%.

While this invention has been described in conjunction with the specific embodiments described above, it is evident that many alternatives, modifications and variations will be apparent to those skilled in the art. Accordingly, this invention is intended to embrace all the alternatives, modifications and variations that come within the spirit and scope of the claims that follow.

What I claim is:

1. A phosphorus-containing polyarylene prepared by reacting at a temperature between 250°F and 600°F (1) a polyarylene having an inherent viscosity of at least 0.01 when measured in trichlorobenzene at 135°C at a concentration of 0.02 g/ml with (2) a phosphorus-containing compound selected from the group consisting of

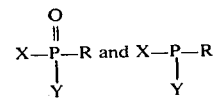

wherein R is phenyl or phenoxy, X is F, Cl, Br, or I, and Y is F, Cl, Br, I, phenyl, or phenoxy.

2. The phosphorus-containing polyarylene of claim 1 wherein the polyarylene and the phosphorus-containing compound are reacted at a pressure between 20 psig and 100 psig.

3. The phosphorus-containing polyarylene of claim 1 wherein the molar ratio of the polyarylene reactant to the phosphorus-containing reactant is from 1:2 to 1:10.

4. The phosphorus-containing polyarylene of claim 1 wherein the phosphorus content is at least 2%.

5. The phosphorus-containing polyarylene of claim 1 wherein the phosphorus-containing compound is diphenyl chlorophosphate.

6. The phosphorus-containing polyarylene of claim 1 wherein the phosphorus-containing compound is phenyl phosphorus dichloride.

7. The phosphorus-containing polyarylene of claim 1 wherein the polyarylene has an inherent viscosity of at least 0.02.

8. The phosphorus-containing polyarylene of claim 1 wherein the polyarylene is produced by the dehydrogenative coupling of partially hydrogenated aromatic hydrocarbons with a catalyst, at a temperature between 750°F and 1300°F, at a pressure between 600 psig and 2000 psig, and in the presence of hydrogen.

9. The phosphorus-containing polyarylene of claim 8 wherein the partially hydrogenated aromatic hydrocarbon is selected from the group consisting of partially hydrogenated benzene, partially hydrogenated biphenyl, partially hydrogenated naphthalene, and alkylated hydrocarbon derivatives thereof.

10. The phosphorus-containing polyarylene of claim 8 wherein the dehydrogenative coupling used to produce the polyarylene is preceded by the controlled partial hydrogenation of aromatic hydrocarbons or a mixture of aromatic hydrocarbons and partially hydrogenated aromatic hydrocarbons with a catalyst, at a temperature between 400°F and 1200°F, at a pressure between 500 and 2000 psig, and in the presence of hydrogen.

11. The phosphorus-containing polyarylene of claim 10 wherein the aromatic hydrocarbon is selected from the group consisting of benzene, biphenyl, toluene, xylene, and naphthalene and the partially hydrogenated aromatic hydrocarbon is selected from the group consisting of partially hydrogenated benzene, partially hydrogenated biphenyl, partially hydrogenated naphthalene, and alkylated hydrocarbon derivatives thereof.

12. The phosphorus-containing polyarylene of claim 1 wherein the polyarylene is produced by the reaction of aromatic hydrocarbons or a mixture of aromatic hydrocarbons and partially hydrogenated aromatic hydrocarbons with a catalyst, at a temperature between 400°F and 1300°F, at a pressure between 600 psig and 2000 psig, and in the presence of hydrogen.

13. The polyarylene of claim 12 wherein the aromatic hydrocarbon is selected from the group consisting of benzene, biphenyl, toluene, xylene, and naphthalene and the partially hydrogenated aromatic hydrocarbon is selected from the group consisting of partially hydrogenated benzene, partially hydrogenated biphenyl, partially hydrogenated naphthalene, and alkylated hydrocarbon derivatives thereof.

* * * * *